July 30, 1929.  H. E. WELCH  1,722,873

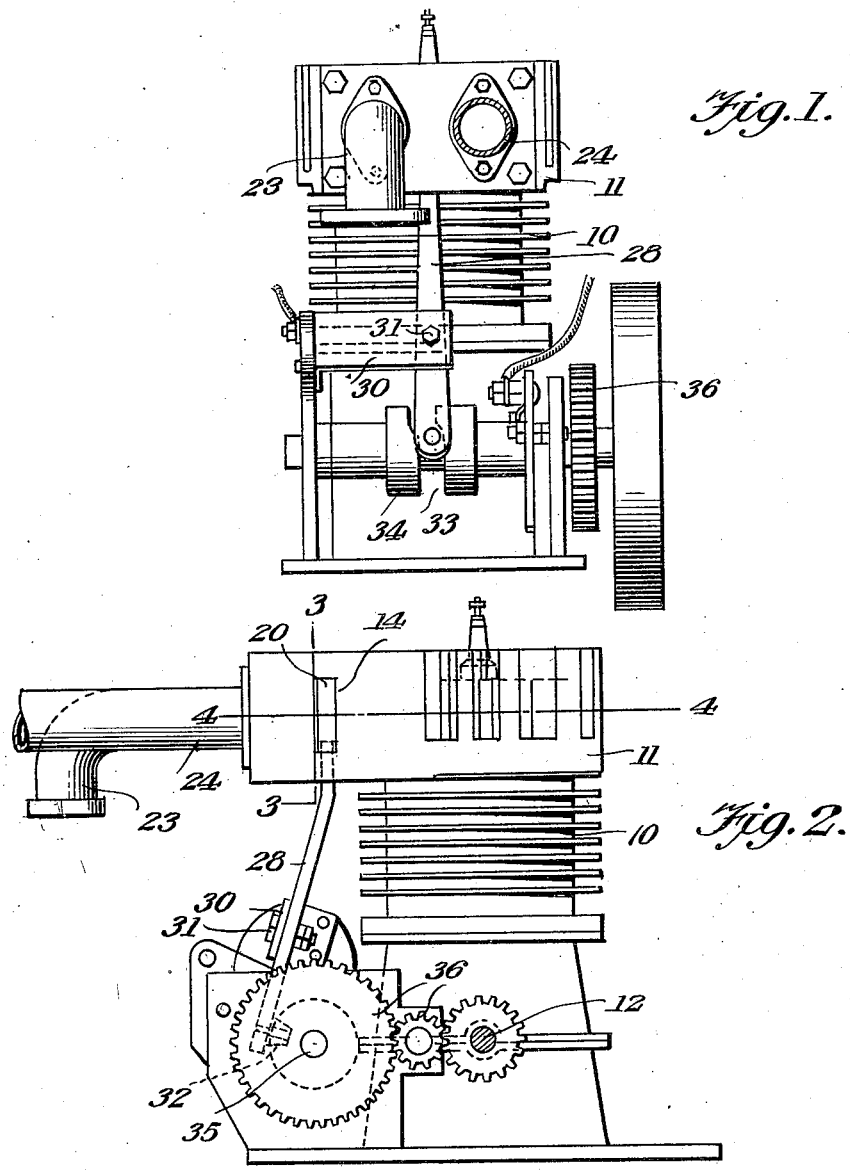

SLIDING VALVE FOR GASOLINE ENGINES

Filed June 25, 1928   3 Sheets-Sheet 2

Henry E. Welch INVENTOR

BY Victor J. Evans ATTORNEY

July 30, 1929.  H. E. WELCH  1,722,873

SLIDING VALVE FOR GASOLINE ENGINES

Filed June 25, 1928  3 Sheets-Sheet 3

Henry E. Welch  INVENTOR

BY *Victor J. Evans*  ATTORNEY

Patented July 30, 1929.

1,722,873

UNITED STATES PATENT OFFICE.

HENRY E. WELCH, OF DELAWARE, OHIO, ASSIGNOR OF ONE-HALF TO GEORGE KRETZLER, OF COLUMBUS, OHIO.

SLIDING VALVE FOR GASOLINE ENGINES.

Application filed June 25, 1928. Serial No. 288,042.

This invention relates to improvements in engines and has especial reference to valves for controlling the intake and exhaust of an internal combustion engine.

An object of the present invention is to provide a valve for this purpose which is slidingly mounted for reciprocatory movement in a simple and efficient manner, and operated to alternately open and close the ports of an engine, the construction resulting in a valve mechanism having a relatively small number of parts and which will not be affected by carbon.

Another object of the invention is a provision of means to compensate for wear without renewing the valve, the invention providing a wear plate which is easily removed and replaced, and which is held in position in a simple and effective manner.

With the above and other objects in view, the invention further includes the following novel features and details of construction, to be hereinafter more fully described, illustrated in the accompanying drawings and pointed out in the appended claim.

In the drawings:—

Figure 1 is an elevation of an engine equipped with the invention.

Figure 2 is an elevation at rightangles to Figure 1.

Figure 3:
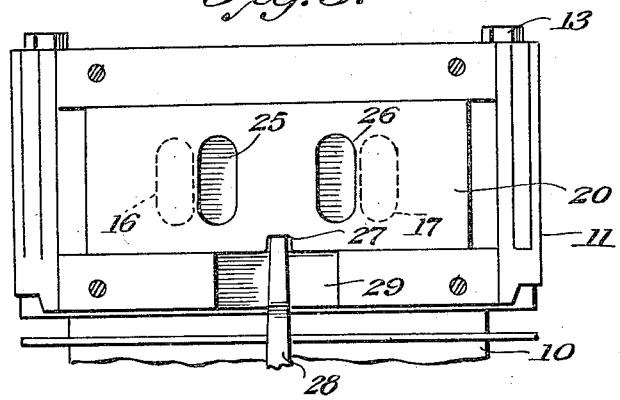
Figure 3 is an enlarged fragmentary section taken substantially on the line 3—3 of Figure 2.

Referring to the drawings in detail wherein like characters of reference denote corresponding parts, the invention is shown as applied to a single cylinder engine of the air cooled type, although it will be obvious when the invention is understood that it may be applied to various types of engines. The engine cylinder is indicated at 10, the cylinder head at 11 and the crank shaft at 12.

The head 11 is suitably bolted in place as shown at 13 and this head is provided at one side of the cylinder at a rightangle with respect to the axial center of the cylinder, with a recess 14. This recess is rectangular in cross section and is in communication with the bore 15 of the cylinder through ports 16 and 17. One of these ports is the intake and the other the exhaust port.

Secured to the outer face of the cylinder head by means of bolts 18 is a plate 19. This plate extends over the recess and forms one wall of a slot within which operates a slide valve 20. The plate 19 is provided with spaced ports 21 and 22 which are in a line with the ports 16 and 17 respectively. The ports 21 and 22 communicate with the inner ends of intake and exhaust pipes 23 and 24.

Figure 4:
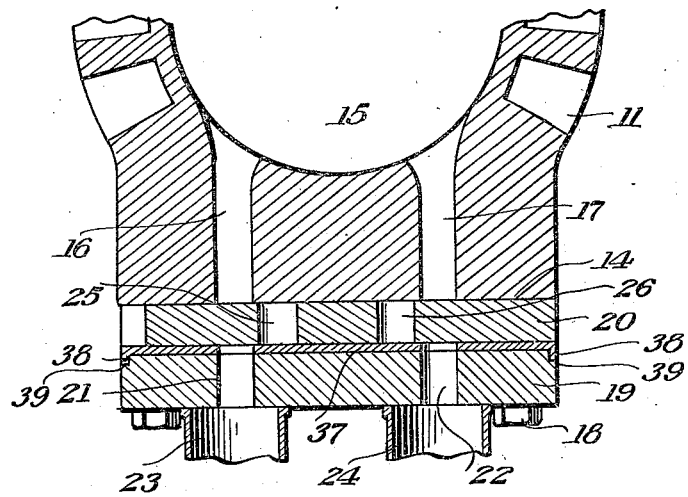
Figure 4 is a fragmentary section on the line 4—4 of Figure 2.
Figure 5:
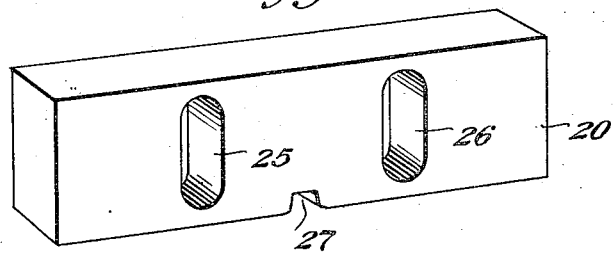
Figure 5 is a detail perspective view of the slide valve.

The slide 20 is provided with spaced ports 25 and 26 which are adapted to be moved into register with the ports 16 and 17 so as to provide communication between these ports and the ports 20 and 21, as will be seen by reference to Figure 4 of the drawings.

For this purpose, the slide 20 is provided with a notch 27 which receives one end of a lever 28, the latter extending through a slot 29 provided at the bottom of the recess 14 and being pivotally mounted upon a bracket 30, as shown at 31. The lower end of the lever 28 carries a tapered roller 32 which operates within a groove 33 provided in a cam 34. This cam is mounted upon a shaft 35 and is driven from the crank shaft 12 of the engine through the medium of gears 36. The ratio of the gearing is such as to properly time the operation of the cam.

Interposed between the plate 19 and the slide 20 is a wear plate 37. This wear plate is provided at opposite ends with rightangularly arranged flanges 38 which are seated in recesses 39 provided in opposite ends of the plate 19. This aids in positioning the plate 37 when assembling the valve mechanism.

In the event of wear, the plate 37 may be readily renewed by removing the plate 19 without disturbing the valve mechanism, and if necessary, a wear plate 37 of increased thickness may be substituted.

Figure 6:
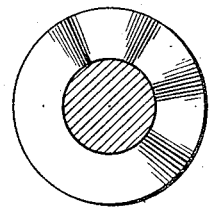
Figure 6 is an elevation looking at one of the walls of the cam groove for operating the valve.
Figure 7:
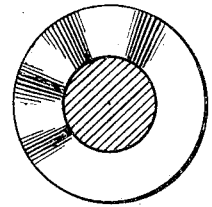
Figure 7 is a similar view looking at the other wall of the cam groove.
Figure 8:
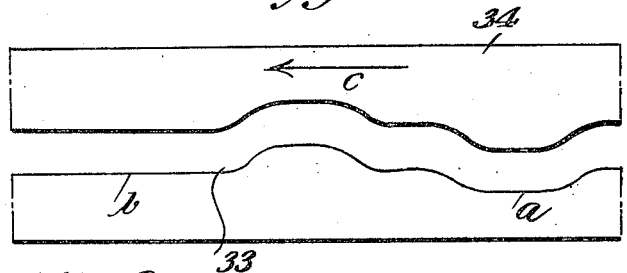
Figure 8 is a diagrammatic view of the cam.
Figure 9:
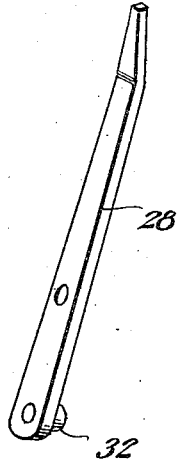
Figure 9 is a detail perspective view of the operating lever for the valve.
Figure 10:
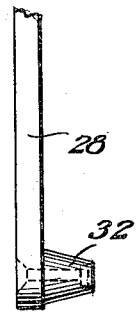
Figure 10 is a fragmentary elevation showing the lower end of the operating lever.

By reference to Figures 6, 7 and 8 of the drawings, it will be seen that the grooved cam is offset as at $a$ to bring one of the ports of the slide into register with one of the ports of the cylinder, for example, the intake port. After leaving this offset portion of the groove, the roller 32 of the lever 38 travels in the dwell or rest portion $b$ of the groove, the fuel charge being compressed and fired during this interval. The roller 32 then enters the oppositely offset portion $c$ of the cam groove which opens the exhaust port.

The invention is susceptible of various changes in its form, proportions and minor details of construction and the right is herein reserved to make such changes as properly fall within the scope of the appended claim.

Having described the invention what is claimed is:

In an engine cylinder, a cylinder head having a recess therein disposed at one side of the cylinder and extending at a right-angle to the axial center of said cylinder, said cylinder having spaced ports therein providing communication between the recess and the bore of the cylinder, a plate removably secured upon the outer face of the cylinder head over the recess and forming one side wall of the latter, said plate having ports extending therethrough in a line with the ports of the cylinder and providing intake and exhaust ports, a slide having spaced ports therein and mounted for movement in the recess to control the cylinder ports, recesses at opposite ends of the plate, a wear plate positioned within the recess between the first mentioned plate and slide, angularly disposed flanges at the ends of the wear plate and extending into the end recesses to provide an interlocking engagement between the wear plate and said first mentioned plate.

In testimony whereof I affix my signature.

HENRY E. WELCH.